United States Patent Office 3,823,036
Patented July 9, 1974

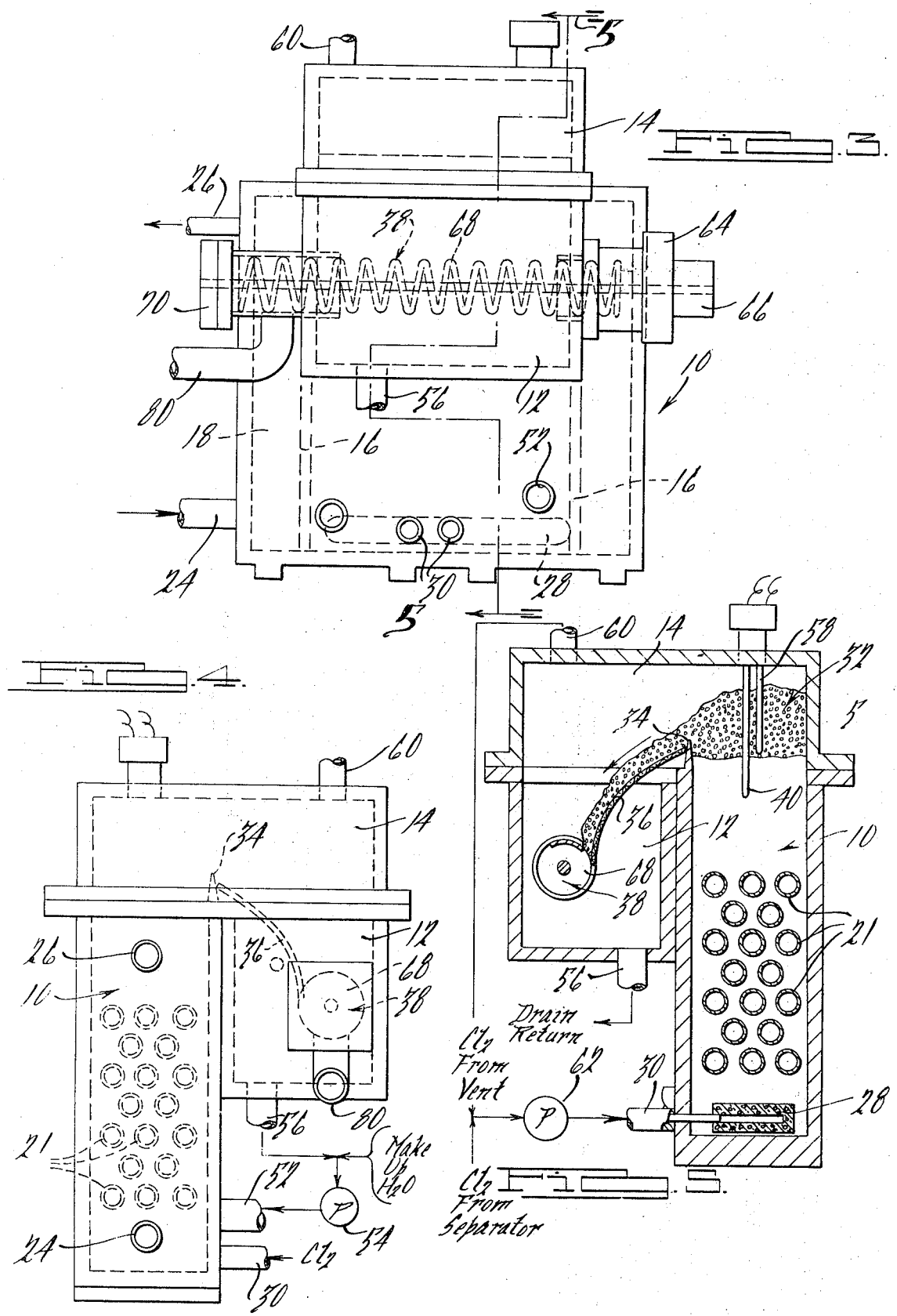

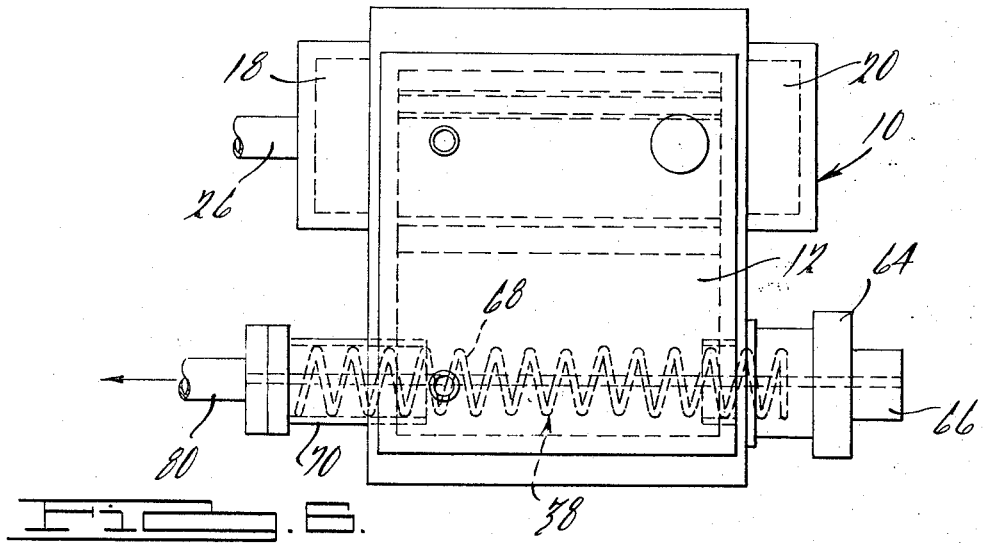
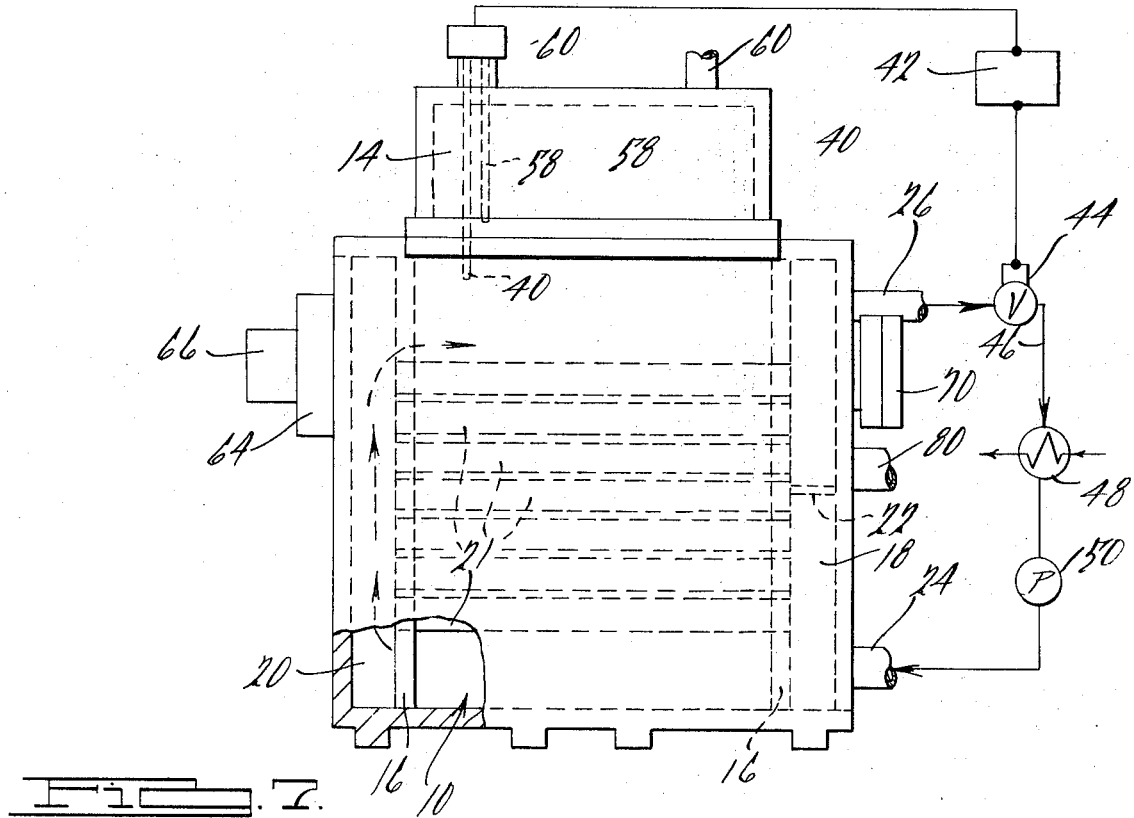

3,823,036
SECONDARY BATTERY COMPRISING MEANS FOR FORMING HALOGEN HYDRATE SOLID BUBBLE SHELLS
Harry K. Bjorkman, Jr., Birmingham, Mich., assignor to Energy Development Associates, Madison Heights, Mich.
Filed May 26, 1972, Ser. No. 257,262
Int. Cl. H01m 35/00, 31/00
U.S. Cl. 136—6 F                6 Claims

ABSTRACT OF THE DISCLOSURE

An apparatus and process for making halogen hydrate whereby a halogen gas is introduced in the form of a plurality of upwardly rising bubbles into the lower portion of a body of an aqueous solution whereby a reaction takes place during the ascent of the gaseous bubbles to produce a solid halogen hydrate shell or layer enveloping each of the bubbles which float as a stable foam layer on the surface of the solution. The resultant foam of halogen hydrate is separated from the aqueous solution, whereafter it is drained and transferred by suitable conveying means to a location remote from the apparatus.

BACKGROUND OF THE INVENTION

In its broad aspects, the present invention is directed to electrical energy storage systems of the type which utilize a solid halogen hydrate as a source of elemental halogen which in combination with an oxidizable metal undergo an electrochemical reaction in a cell to produce an electrical current. The halogen component is adapted to be entrained in a suitable aqueous electrolyte and is conveyed in electrical contact with a normally positive electrode at which it is reduced during the normal discharge of the storage battery. Simultaneously, a suitable oxidizable metal is oxidized at a normally negative electrode and the oxidized metal ion and the reduced halogen ion enter the electrolyte as a dissolved metal halide salt. In accordance with a preferred practice of such electrical energy storage systems, the halogen hydrate is stored in a reservoir remote from the electrode cell area and a replenishment of the halogen component is achieved by a circulation of the electrolyte through the hydrate storage area in which the halogen hydrate progressively decomposes, liberating additional halogen which becomes dissolved or entrained in the electrolyte.

A metal/halogen hydrate electrical energy storage system of the type to which the present invention is applicable is fully described in copending U.S. patent application Ser. No. 50,054, filed June 26, 1970 now U.S. Pat. 3,713,888, entitled "Halogen Hydrates." This prior pending patent application is owned by the same assignee as the present invention and details thereof beyond those herein described are incorporated in this application by reference. Metal/halogen hydrate electrical energy storage systems or secondary storage batteries are conveniently categorized as being of the high energy density (H.E.D.) type because of their capacity to supply upwards of 50 watt hours of electric power per pound of weight. This high electrical energy capacity coupled with the compactness and low weight of such secondary storage batteries has rendered them particularly satisfactory for use as principal and auxiliary sources of electrical energy in either mobile or stationary power plant systems.

The metal/halogen hydrate secondary storage batteries have advantages over other secondary storage systems of the types heretofore known in view of the ability of such batteries to be refueled or recharged efficiently and quickly to a fully-charged condition. In a refuelable storage battery arrangement, a replenishment of the elemental halogen component is achieved by periodically withdrawing a controlled proportion of the aqueous electrolyte to maintain the volume thereof within a predetermined range and substituting therefor a solid halogen hydrate which is adaped to decompose during the normal discharge of the storage battery to liberate elemental halogen and water. The resultant decomposition of the halogen hydrate adds water to the aqueous electrolyte progressively increasing its volume, while at the same time maintaining the concentration of the metal halide dissolved therein substantially constant during the discharge cycle of the storage battery. Accordingly, the solid halogen hydrate constitutes an extremely convenient technique by which to store the halogen component and to continually effect a replenishment thereof at the electrode area during the normal discharge of the storage battery.

In a rechargeable storage battery arrangement, an electrical recharging of the storage battery is effected by applying a direct current of reverse polarity to the electrode area, effecting a reduction of the oxidized metal to the metallic state and an oxidation of the halide dissolved in the electrolyte to the elemental state, whereby the resultant halogen gas is separated and is reacted in the presence of water to again form the corresponding halogen hydrate. The resultant regenerated halogen hydrate is returned to the halogen hydrate storage area of the storage battery for reuse during the next discharge cycle.

It will be apparent from the foregoing that in both the refuelable and the rechargeable storage battery arrangements, the formation or regeneration of the halogen hydrate is important in restoring the battery to a fully-charged condition. The formation of the halogen hydrate or a regeneration thereof can be accomplished by employing an apparatus in accordance with the present invention which may comprise an integral component of the secondary storage battery system or, alternatively, may be located in a position remote from the system but associated therewith during periods of recharging or refueling of the battery.

SUMMARY OF THE INVENTION

The benefits and advantages of the present invention are achieved by a secondary electrical energy storage battery integrally incorporating or associated with a halogen hydrate forming apparatus in which the halogen hydrate is produced in the form of a stable foam comprised of a plurality of minute hollow spheres which are readily crushable or compactible to alternate configurations suitable for effecting a replenishment of the halogen hydrate storage reservoirs of secondary storage battery systems.

In the specific apparatus aspects of the present invention, a framework is provided which defines a three-dimensional enclosure containing a reservoir of an aqueous solution having submerged therein a distributor for introducing a halogen gas in the form of a plurality of bubbles. The aqueous solution is maintained at a controlled temperature conducive to the formation of a solid halogen hydrate during the upward rising movement of the bubbles, whereby the hydrate forms as solid layers or shells enveloping each of the gaseous bubbles. The resultant solid hydrate foam or froth accumulates as a floating layer on the upper surface of the aqueous solution and is removed therefrom and separated from the residual aqueous solution, whereafter it is transferred by suitable tarnsfer means to a location remote from the forming apparatus. The transfer means may operate in a manner to effect a compaction of the foam and a release of any entrapped halogen gas in the interior of the spherical bubbles produced.

In accordance with the method aspects of the present invention, an improved technique is disclosed for producing a particulated halogen hydrate in the form of a foam which is adaptable for use in refueling or recharging a metal/halogen hydrate electrical energy storage system to restore it to a fully-charged condition.

Additional benefits and advantages of the present invention will become apparent upon a reading of the description of the preferred embodiments, taken in conjunction with the accompanying drawings.

BRIEF DESCRIPTION OF THE DRAWINGS

FIG. 3 is a front elevational view of the halogen hydrate foam former;

FIG. 4 is an end elevational view of the hydrate former apparatus shown in FIG. 3;

FIG. 5 is a transverse vertical sectional view through the halogen hydrate former apparatus shown in FIG. 3 and taken substantially along the line 5—5 thereof;

FIG. 6 is a plan view of the halogen hydrate former shown in FIG. 3; and

FIG. 7 is a rear elevational view of the halogen hydrate former apparatus shown in FIGS. 3–6.

DESCRIPTION OF THE PREFERRED EMBODIMENTS

Figure 1:
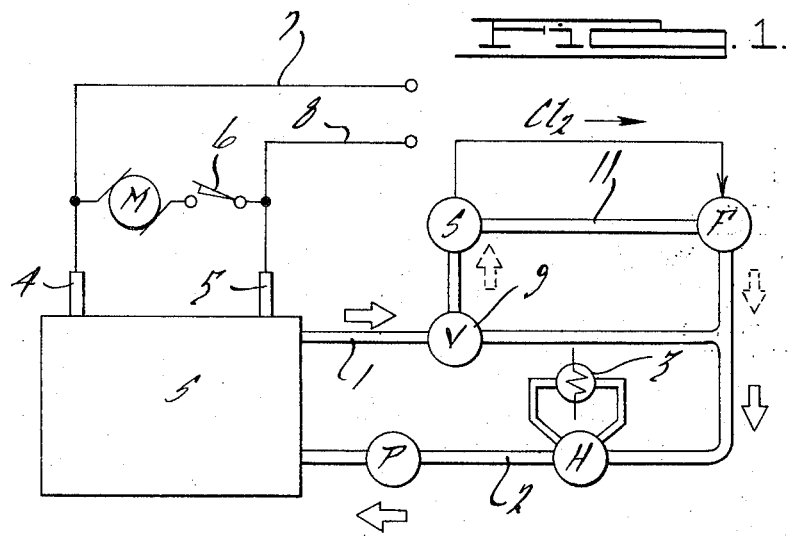
FIG. 1 is a schematic flow sheet illustrating the disposition of the components of a secondary electric storage battery of the metal/halogen hydrate type to which the forming apparatus of the present invention is applicable.

The oxidizable metal/halogen hydrate electrical energy storage system to which the present invention is applicable comprises an electrolyte consisting of a solution containing a dissolved metal halide and a dissolved and/or entrained halogen gas which is adapted to be reduced upon coming in contact with the normally positive electrode of a cell during the normal discharge cycle of the device. The electrolyte may further contain various additives and ingredients to impart controlled modifications and/or variations in the physical and chemical properties thereof in order to provide optimum efficiency in operation of the electrical energy storage device under different operating circumstances.

In accordance with a preferred practice of the present invention, the electrolyte is comprised of an aqueous solution which may contain from as little as about 0.1% by weight up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, Na, Rb, Cs, Be, Mg, Ca, Sr and Ba. Those metals which react with water may be alloyed to induce stability, such as amalgams (solutions in mercury). Of the foregoing metals, zinc constitutes the most preferred metal, while iron, cobalt and nickel are preferable to the remaining enumerated metals. Of the various halogen constituents, chlorine and bromine are preferred and the chloride salts of the aforementioned preferred metals are particularly satisfactory in the practice of the present invention and constitute a preferred embodiment thereof. Particularly satisfactory results are obtained employing an aqueous electrolyte incorporating zinc chloride as the metal halide.

Although as previously indicated concentrations of the metal halide in the electrolyte as low as about 0.1% can be employed, it is preferred that the metal halide be present in concentrations of at least about 5% to about 50%, and more usually in concentrations from about 10% up to about 35% by weight. In those instances in which zinc chloride is utilized as the metal halide, a maximum conductivity of the electrolyte is obtained when a concentration of about 25% by weight of zinc chloride is present. Accordingly, when zinc chloride is the metal halide in an aqueous electrolyte, concentrations ranging from about 10% to about 35% by weight have been found particularly satisfactory.

The electrochemical reaction that occurs in the storage battery is represented by the following equations, which are representative of the situation in which the oxidizable metal is zinc, the halogen is chlorine and the hydrate is chlorine hydrate.

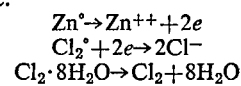

$$Zn^\circ \rightarrow Zn^{++} + 2e$$
$$Cl_2^\circ + 2e \rightarrow 2Cl^-$$
$$Cl_2 \cdot 8H_2O \rightarrow Cl_2 + 8H_2O$$

As will be noted from the foregoing equations, the progressive oxidation of the zinc to a zinc ion which becomes dissolved in the electrolyte and a corresponding reduction of elemental chlorine to a chloride ion, which also becomes dissolved in the electrolyte, would tend to effect an increase in the concentration of the metal halide in the electrolyte were it not for the fact that the progressive decomposition of the halogen hydrate results in a progressive liberation of water serving as a diluent, thereby maintaining the metal halide salt concentration in the electrolyte reasonably constant throughout the discharge cycle of the storage battery. Although the concentration of the electrolyte remains substantially constant, the total volume thereof progressively increases and appropriate provision is made in the system for accommodating such an increased electrolyte volume during operation of the storage device. As halogen hydrate decomposes, more space is available in the storage area for handling the electrolyte. A corresponding reduction in the volume of electrolyte occurs during a recharging of the electrical storage system in which a corresponding amount of dissolved metal halide is removed from the electrolyte and the resultant halogen, in combination with a portion of the water, is formed into the corresponding halogen hydrate for storage.

Referring now in detail to the drawings, and as may be best seen in FIG. 1, a typical flow arrangement of a rechargeable electrical energy storage system is illustrated in accordance with the preferred practice of the present invention. As shown, the system comprises an electrode area or stack, indicated at S, which is comprised of one and more usually a plurality of individual cells, each containing a normally positive electrode and a normally negative electrode. The stack is connected by means of an outlet pipe 1 and a return pipe 2 to a halogen hydrate storage area or receptacle, indicated at H, and through which pipes the electrolyte is continuously recirculated such as by means of a pump P. The passage of the electrolyte through the hydrate storage reservoir H during a normal discharge cycle of the storage device effects a progressive decomposition of the halogen hydrate therein, whereby the liberated halogen gas is dissolved and/or entrained in the electrolyte and is conveyed by means of the return line 2 to the stack S for replenishment of the supply of elemental halogen at the normally positive electrodes therein. Since the decomposition of the halogen hydrate is an endothermic reaction, the storage reservoir H suitably may be provided with a heat exchanger, indicated at 3, for maintaining the halogen hydrate and the electrolyte therein at a temperature at which optimum performance of the storage battery is achieved during a discharge cycle.

The stack S, as shown in FIG. 1, is provided with a positive terminal 4 and a negative terminal 5, which are adapted to be electrically connected to a load, such as a drive motor M, which is selectively operable in response to a switch 6 disposed in the circuit. At such time that the reactive constituents within the electrical energy storage device become depleted or approach depletion, an electrical recharging of the storage system is effected by applying an electrical current of opposite polarity across the terminals 4, 5, such as by wires 7, 8, respectively, which are adapted to be electrically connected to an external power source such as a commercially generated alternating current which has been subjected to rectification for use in the recharging cycle.

During the recharging cycle, a reversal of the chemical reaction is effected, whereby the oxidized metal present in the form of a dissolved ion in the electrolyte is reduced at the normally negative electrode and deposits or plates out while the halide ion becomes oxidized at the normally positive electrode, returning to the elemental state in the form of dissolved or minute gas bubbles in the electrolyte. The halogen gas thus formed is continuously removed from the cell by the electrolyte through the outlet line 1 and the electrolyte is diverted, such as by a selector valve 9, through a branch circuit 11 having a separator device S therein for recovering the halogen gas and a hydrate former device F for effecting a regeneration of the halogen hydrate. The halogen hydrate thus regenerated is returned by the circulating electrolyte to the storage reservoir H in which it is separated and retained in readiness for the next discharge cycle of the storage device.

In accordance with one embodiment of this invention, the hydrate former F and the cooling or refrigeration apparatus R are incorporated in the system in accordance with the arrangement schematically illustrated in FIG. 1. In this embodiment, a recharging of the electrical energy storage system can conveniently be achieved by connecting the wires 7, 8 to a commercial source of a rectified current such as purchased from a local utility, effecting an in situ recharging of the system from time to time as may be necessary. Systems of this arrangement are suitable for use as the principal or auxiliary power system for the propulsion of vehicles or other mobile apparatus.

In accordance with an alternative satisfactory embodiment of this invention, the hydrate former F and the refrigeration or cooling unit R are disconnected from the system during normal discharge thereof and are located at a central processing or service station. In accordance with this latter arrangement, an appropriate amount of electrolyte is withdrawn from electrical storage systems which are in a substantially discharged condition and the electrolyte is reprocessed through the local service station processing facility to effect a regeneration of the halogen hydrate and a recovery of the metal. The halogen hydrate and metal can be directly inserted into the discharged storage battery, effecting a refueling thereof and a restoration of the battery to a fully-charged condition. The refrigeration unit R and the hydrate former provide for increased efficiency due to the larger size of such units which are adaptable for servicing a plurality of storage batteries, while at the same time providing for a proportional reduction in the weight of such storage battery systems in view of the elimination of the refrigeration and hydrate forming components.

Figure 2:
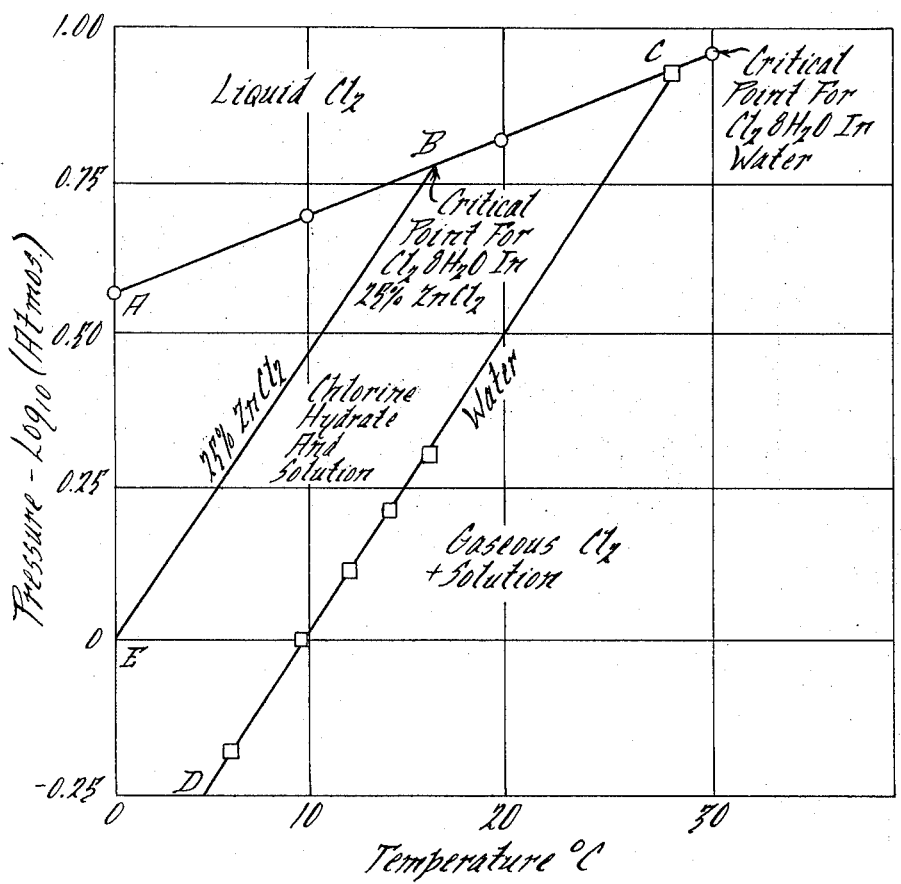
FIG. 2 is a phase diagram of the temperature and pressure conditions in relationship to a halogen hydrate system in which the halogen consists of chlorine, the metal comprises zinc and the aqueous solution contains the corresponding zinc chloride salt.

In either event, a hydrate former constructed in accordance with the preferred practice of the present invention is illustrated in FIGS. 3–5 of the drawings. The particular temperature, pressure and operating characteristics of the hydrate former shown will vary depending upon the composition of the electrolyte or aqueous solution employed, the type of halogen utilized and the concentration and type of metal ions present. A phase diagram is shown in FIG. 2 which depicts a temperature-pressure relationship of the various phases present and the critical temperatures and pressures applicable to chlorine hydrate which comprises the preferred hydrate of the present invention. As noted in FIG. 2, the area bounded by the points A, C, D encompasses those conditions in which chlorine hydrate is present as a solid in water. Below and to the right of the line CD, gaseous chlorine is present in water. Above and to the left of line AC, liquid chlorine is present. In the area bounded by the points A, B and E, chlorine hydrate is present as a solid in a 25% concentration of zinc chloride in water. It will be appreciated that the phase diagram, as shown, encompasses three phases; namely: solid, liquid and gas. The critical temperature of a halogen hydrate, such as chlorine hydrate as shown in FIG. 2, is defined for the purposes of the present invention as that temperature above which a halogen hydrate cannot exist.

Referring now in detail to FIGS. 3–7, the hydrate former shown comprises a framework defining a three-dimensional enclosure consisting of a reaction tank or chamber 10, an overflow tank or sump 12 disposed adjacent thereto and an overhead gas vent chamber 14 overlying the tank 10 and sump 12. The side portions of the tank 10, as best seen in FIG. 7, are divided by two vertically extending transverse partitions 16 defining end chambers 18, 20. A plurality of heat transfer tubes 21 extend between the partitions 16 and are disposed with their ends in communication with end chambers 18, 20, respectively. The end chamber 18 is provided with a baffle 22 spaced approximately midway along the height thereof, dividing the chamber into two compartments. The lower compartment is connected to an inlet line 24 for supplying a liquid coolant or heat transfer liquid thereto which is directed through the heat transfer tubes 21 into the lower portion of the chamber 20 and thereafter upwardly and back through the upper heat transfer tubes into the upper compartment of the end chamber 18 from which the liquid is discharged through an outlet 26.

The reaction tank 10 is adapted to be filled with water or a suitable aqueous solution comprising the electrolyte or a consolidation of the electrolyte and make-up water plus any drained liquid recovered from the hydrate foam produced. A distributor 28, as best seen in FIGS. 3 and 5, is disposed adjacent to the bottom of the reaction tank 10 and extends longitudinally for a portion of the length thereof. The distributor is of a porous construction and preferably is comprised of a glass frit. The interior of the distributor 28 is connected to a supply line 30, through which a pressurized halogen gas is introduced into the distributor for discharge therefrom in the form of a plurality of minute gaseous bubbles that pass upwardly through the aqueous solution in the reaction tank 10 and in heat transfer relationship relative to the periphery of the heat transfer tubes 21 extending therethrough.

In accordance with the halogen hydrate reaction, the halogen gas contained within the bubble reacts at the interface with the water of the aqueous solution, forming a shell or layer comprised of a solid hydrate enveloping the bubble. The buoyancy of the enveloped gaseous bubble causes it to rise and eventually float in the form of a stable froth or foam, indicated at 32, on top of the aqueous solution in a manner as best seen in FIG. 5. As the foamed halogen hydrate accumulates above the reaction tank 10, it eventually cascades above a weir 34 and thereafter passes downwardly and to the left as viewed in FIG. 5 on a foraminous chute or screen 36 extending downwardly toward a screw conveyor 38.

As previously mentioned, the formation of halogen hydrate relies on an exothermic reaction and the heat thus liberated in the reaction tank 10 is continuously removed by the heat transfer tubes 21 disposed in heat transfer contact with the aqueous solution contained therein. In addition to extracting the exotherm, the heat transfer tubes also control the temperature of the aqueous solution in order to maintain the solution and the halogen gas therein within a range conducive to the formation of the halogen hydrate under the specific pressure conditions existing within the hydrate former enclosure. For aqueous solutions containing zinc chloride and employing chlorine for the formation of chlorine hydrate, a control of the solution within a temperature of from about 0° C. up to about 9° C. above its normal freezing point at atmospheric pressure comprises a preferred practice of the present invention. Temperatures within the aforementioned range can be conveniently maintained by employing coolants at inlet temperatures of −25° C. up to about 5° C.

The amount of heat extracted from the aqueous solution in the reaction tank is controlled in accordance with the arrangement schematically shown in FIG. 7. As shown, a resistance thermometer or thermal probe 40 extends downwardly from the top of the gas chamber 14 with the lower end thereof immersed in the aqueous solution in the reaction tank. The temperature sensed by the thermal probe is transmitted to a control box 42 containing circuitry of the type well known in the art, which in turn is operative to control a flow control valve 44 disposed in the recirculating line 46 of the liquid coolant. The coolant passing through the line 46 is cooled upon passing through a heat exchanger 48, whereafter it is pumped by a pump 50 back into the inlet 24 of the end chamber 18. In accordance with this arrangement, appropriate temperature control of the aqueous solution is maintained by controlling the quantity of coolant that is continuously recirculated through the heat exchanger tubes.

Since water is continuously consumed in the reaction tank during the formation of halogen hydrate, a continuous replenishment thereof is effected to maintain the level of the aqueous solution at a point just below the weir 34, as shown in FIG. 5. As schematically shown in FIG. 4, a replenishment of water or aqueous solution is achieved by a solution inlet 52, which is connected to a proportioning pump 54, the inlet of which is connected to a drainage line 56 connected to the bottom of the sump 12 and a source of make-up water or solution. The level of liquid in the reaction tank is continuously sensed by a liquid level sensor 58 disposed adjacent to the thermal probe 40, as shown in FIG. 5. The liquid level sensor 58 is connected by appropriate circuitry of the type well known in the art to a controller, which is operable for controlling the proportioning pump 54, which in turn controls the quantity of make-up water and solution entering the solution inlet 52.

The stable halogen hydrate foam comprises a plurality of individual shells or balloons encapsulating each of the bubbles of halogen gas. The balloons or shells are relatively fragile and upon entering the screw conveyor 38, are compacted and fractured, whereby the entrained halogen gas is liberated which along with my unreacted gas passes upwardly out through the vent tube 60, as best seen in FIG. 5, and is returned to the inlet side of a halogen gas pump 62. Make-up chlorine, such as derived from the separator S of FIG. 1, is also supplied to the inlet side of the halogen pump 62 and the combined halogen streams are transferred by the pump to the inlet 30 connected to the distributor 28.

As shown in FIG. 3-7, the screw conveyor 38 includes a tubular drive housing 64 projecting laterally of one side of the sump 12 which contains a suitable drive motor 66 which is magnetically or otherwise drivingly coupled to the end of the conveyor screw 68. The opposite end of the screw 68 is rotatably supported in a tubular extension 70 formed with a discharge port 72 in the lower portion thereof, through which the drained halogen hydrate can be conveyed to a location remote from the hydrate former such as to the storage reservoir H shown in FIG. 1.

It is also contemplated in accordance with the practice of the present invention that in lieu of using the screw conveyor 38, the hydrate foam 32 cascading downwardly along the screen 36 can be suitably conveyed in the form of a slurry in the electrolyte and returned to the storage reservoir of the electrical energy storage system. The slurry can be filtered to extract the halogen hydrate and the filtrate can be returned to the hydrate former as may be desired.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In a secondary electrical energy storage system, the combination comprising at least one cell comprised of a normally positive electrode for reducing a halogen disposed in electrical contact therewith and a normally negative electrode for oxidizing an oxidizable metal disposed in electrical contact therewith during an electrical discharge or said cell, a storage reservoir adapted to contain a quantity of halogen hydrate, an aqueous electrolyte containing ions of said metal and said halogen, communicative means for connecting said cell to said reservoir, circulating means for circulating said electrolyte through said communicative means between said cell and said reservoir for progressively oxidizing said oxidizable metal and decomposing said halogen hydrate during discharge of said cell, recharging means associated with said storage system including a source of electrical energy to effect an oxidation of the ions of said halogen to the elemental state, means for recovering the elemental halogen produced, and hydrate forming means for forming a mixture of the recovered said halogen and water in a proportion suitable for forming the corresponding halogen hydrate, said hydrate forming means comprising means defining a body of water, distributor means for introducing the halogen gas into the lower portion of said body of water in the form of a plurality of upwardly rising bubbles, heat transfer means for controlling the temperature of said body of water to within a preselected temperature range conducive to the formation of a halogen hydrate in the form of solid shells enveloping each of said bubbles of halogen gas, separating means for separating the halogen hydrate from said body of water, and return means for returning the regenerated said halogen hydrate to said reservoir of said electrical energy storage system.

2. The secondary electrical energy storage system as defined in claim 1, in which the halogen hydrate produced is recovered in the form of a floating foam layer on said body of water and further including means for effecting at least a partial compaction of said foam layer by rupturing at least some of the shells of halogen hydrate.

3. The system of Claim 1 wherein the halogen hydrate is chlorine hydrate.

4. The system of Claim 3 wherein the electrolyte is zinc chloride having a concentration ranging from about 10% to about 35% by weight and the oxidizable metal is comprised of zinc.

5. The system of Claim 2 wherein the halogen hydrate is chlorine hydrate.

6. The system of Claim 2 wherein the electrolyte is zinc chloride having a concentration ranging from about 10% to about 35% by weight and the oxidizable metal is comprised of zinc.

References Cited

UNITED STATES PATENTS 3,713,888   1/1973   Symons _____ 136—6 R

ALLEN B. CURTIS, Primary Examiner

H. A. FEELEY, Assistant Examiner

U.S. Cl. X.R.

136—86 A